(12) United States Patent
Kleckler

(10) Patent No.: US 9,169,783 B2
(45) Date of Patent: Oct. 27, 2015

(54) ELECTROHYDRAULIC PROPELLER GOVERNOR

(75) Inventor: Joel W. Kleckler, Rockton, IL (US)

(73) Assignee: Woodward, Inc., Fort Collins, CO (US)

( * ) Notice: Subject to any disclaimer, the term of this patent is extended or adjusted under 35 U.S.C. 154(b) by 634 days.

(21) Appl. No.: 13/483,714

(22) Filed: May 30, 2012

(65) Prior Publication Data

US 2013/0323050 A1 Dec. 5, 2013

(51) Int. Cl.
| | | |
|---|---|---|
| *B64C 11/40* | (2006.01) | |
| *F02C 9/58* | (2006.01) | |
| *B64C 11/30* | (2006.01) | |
| *B64C 11/38* | (2006.01) | |

(52) U.S. Cl.
CPC ................. *F02C 9/58* (2013.01); *B64C 11/303* (2013.01); *B64C 11/385* (2013.01); *B64C 11/40* (2013.01); *F05D 2260/77* (2013.01); *Y02T 50/671* (2013.01)

(58) Field of Classification Search
CPC ....... F02C 9/58; B64C 11/385; B64C 11/303; B64C 11/305; B64C 11/40; F05D 2260/77
USPC .............. 416/1, 36, 38, 44, 46, 47, 48, 49, 43
See application file for complete search history.

(56) References Cited

U.S. PATENT DOCUMENTS

| | | | |
|---|---|---|---|
| 3,001,588 A | | 9/1961 | Fischer |
| 4,588,354 A | * | 5/1986 | Duchesneau et al. ........... 416/48 |
| 5,023,793 A | | 6/1991 | Schneider et al. |
| 5,174,718 A | | 12/1992 | Lampeter et al. |
| 6,059,528 A | | 5/2000 | Danielson et al. |
| 6,077,040 A | * | 6/2000 | Pruden et al. ................... 416/46 |
| 6,196,797 B1 | | 3/2001 | Bogden et al. |
| 8,075,271 B2 | | 12/2011 | Muhlbauer |

FOREIGN PATENT DOCUMENTS

| | | |
|---|---|---|
| EP | 0113690 | 7/1984 |
| EP | 0200337 | 11/1986 |
| GB | 2209371 | 5/1989 |

OTHER PUBLICATIONS

International Search Report and Written Opinion of the International Searching Authority issued in International Application No. PCT/US2013/042864 on Apr. 14, 2014; 11 pages.
AOPA Air Safety Foundation, "Propeller Safety" Safety Advisor, Technology No. 3, 2005 (12 pages).

(Continued)

*Primary Examiner* — Christopher Verdier
(74) *Attorney, Agent, or Firm* — Fish & Richardson P.C.

(57) ABSTRACT

A propeller governor for controlling blade pitch of a variable pitch propeller has a hydraulic control circuit coupled to the propeller to change blade pitch in response to hydraulic pressure. The hydraulic control circuit has a first pressure path configured to adjust blade pitch within a first range of blade pitch, and a second, different pressure path configured to adjust blade pitch within a second range of blade pitch. An electrohydraulic servo valve of the governor is configured to adjust hydraulic pressure in the first pressure path to adjust blade pitch within the first range and to adjust hydraulic pressure in the second pressure path to adjust blade pitch within the second range.

16 Claims, 3 Drawing Sheets

(56) References Cited

OTHER PUBLICATIONS

McCauley, "Propeller System Technology Guide," 2009 (20 pages).

Authorized Officer Simin Baharlou, International Preliminary Report on Patentability, PCT/US2013/042864, Dec. 11, 2014, 7 pages.

* cited by examiner

ELECTROHYDRAULIC PROPELLER GOVERNOR

BACKGROUND

A propeller governor is a system that controls the blade pitch of a variable pitch propeller to allow the engine driving the propeller to run a constant speed, in some circumstances, and allow the blade pitch to be controlled to a user specified input, in other circumstances. Early propeller governors were mechanical systems using flyweights for sensing speed and complex linkages for controlling the blade pitch. Different configurations of electric governors, such as electrohydraulic governors, have been developed that take advantage of electronic control technology. However, cost is a significant barrier to entry for electronic based propeller governors to displace mechanical propeller governors.

DESCRIPTION OF DRAWINGS

Like reference symbols in the various drawings indicate like elements.

DETAILED DESCRIPTION

Figure 1:
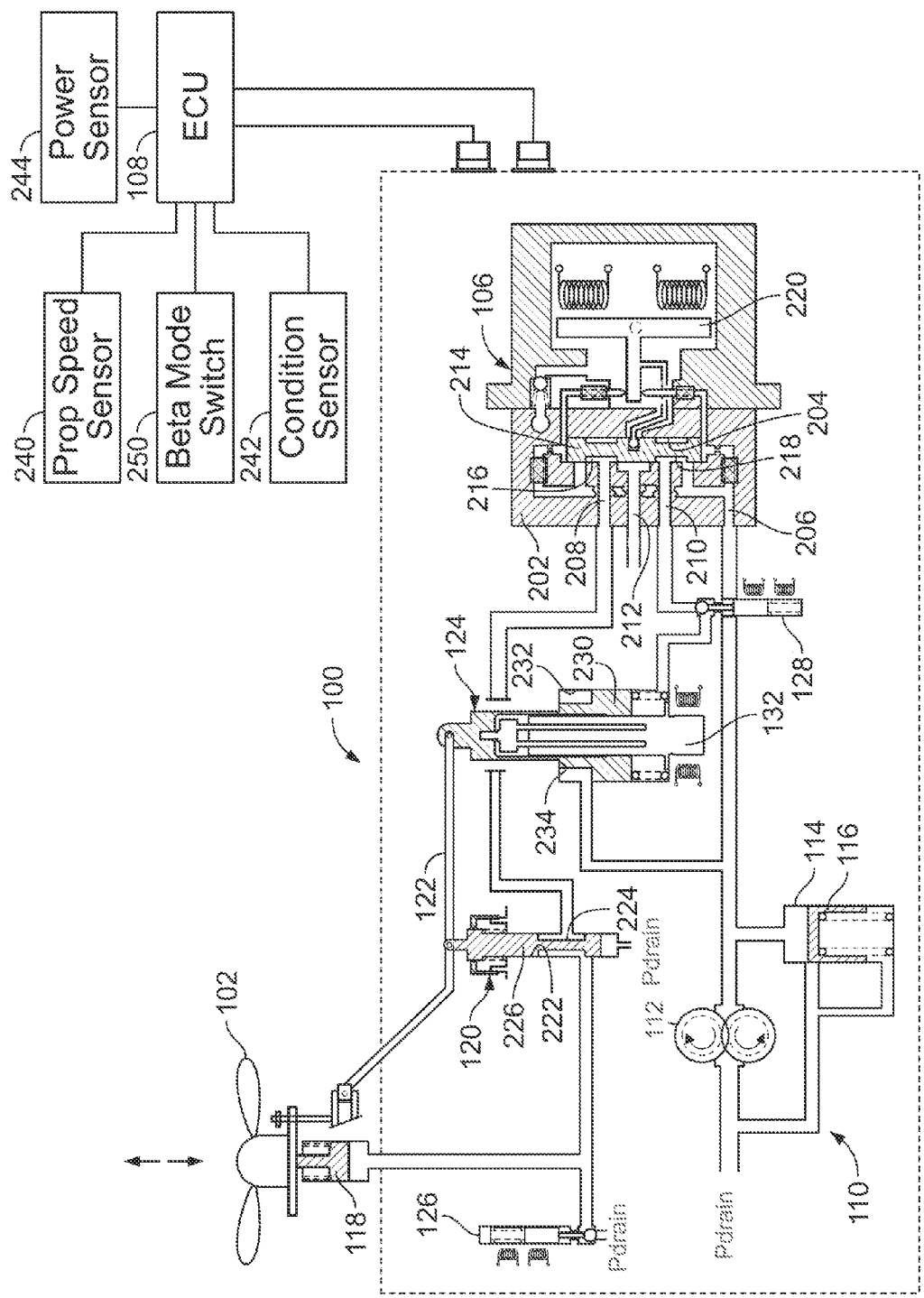
FIG. 1 is a schematic of an example electrohydraulic propeller governor.

FIG. 1 shows an example electrohydraulic propeller governor 100. The propeller governor 100 is coupled to a blade pitch adjustment mechanism of a rotating propeller 102, and operates in controlling the blade pitch of the propeller. The propeller governor 100 is of the type that would be used to control the blade pitch on the propeller of an aircraft, for example, a turboprop, a propeller driven by an internal combustion engine, and/or another. However, the concepts herein can be applied to governing propellers and fans of other vehicles and mechanisms.

Blade pitch is the angle of attack of the propeller's 102 blades. The steeper the pitch, also called coarse or feather, the higher the angle of attack and the nearer the blades of the propeller 102 are to being in alignment with the direction of airflow. The shallower the pitch, also called fine, the lower the angle of attack and the nearer the blades of the propeller 102 are to being perpendicular with the direction of airflow.

The example governor 100 controls the blade pitch in one of two modes: a flight mode intended to be used during flight and a beta mode intended to be used during taxiing taxing. In the flight mode, the pitch of the blades is maintained within a first range of blade pitch and adjusted by the governor 100 in response to the rotational speed of the propeller 102 to maintain a user specified rotational speed. The first range of blade pitch is shallow (fine) to coarse and includes only forward pitch angles that would be used during flight. In the beta mode, the pitch of the blades is maintained within a second range of blade pitch and adjusted by the governor 100 in response to a user specified blade pitch, i.e., to maintain the user specified blade pitch. The second range of blade pitch is shallow (fine) to full reverse, including both forward pitch angles and reverse pitch angles. The second range, for example, includes pitch angles that would be used during taxiing the aircraft. The forward pitch angles are those that drive the aircraft forward, while the reverse pitch angles are those that drive the aircraft in reverse. In certain instances, the first range of blade pitch does not overlap with the second range of blade pitch.

The propeller governor 100 is an electrohydraulic propeller governor in that it uses both a hydraulic control circuit and is electronically controlled via a electrohydraulic servo valve 106 and an electronic control unit 108 (i.e., ECU). Unlike a fully mechanical propeller governor, the electrohydraulic propeller governor 100 does not need flyweights or complex linkages to control blade pitch.

The hydraulic control circuit is coupled to the blade pitch adjustment mechanism of the propeller 102 (e.g., the prop cone) and is responsive to hydraulic pressure to change the blade pitch of the propeller 102. The hydraulic control circuit has two different pressure paths, one for adjusting the blade pitch in flight mode and another for adjusting the blade pitch in beta mode. The servo valve 106, at the control of the ECU 108, modulates pressure in each of these paths to control whether the governor 100 operates in flight mode or beta mode and to adjust the blade pitch within each mode.

The servo valve 106 receives pressure from a pressure source 110 of the hydraulic control circuit 104. The pressure source 110 includes a pump 112 whose outlet is in fluid communication with a corresponding inlet of the servo valve 106. The servo valve 106 vents pressure to a pressure drain path that communicates fluid to an inlet to the pump 112. Pressure from the outlet of the pump 112 is higher than the pressure into the inlet of the pump 112. The pressure source 110 further includes a pressure regulator 114 in fluid communication with both the inlet to the pump 112 and the outlet of the pump 112. The pressure regulator 114 maintains a specified pressure downstream of the pump 112.

In certain instances, the pressure regulator 114 is of a type that includes a piston 116 biased (e.g. by a spring, pressure and/or otherwise) to seal against passage of pressure from the outlet of the pump 112 back to the inlet of the pump 112. However, the piston 116 is biased such that if the pressure at the outlet of the pump 112 exceeds the specified pressure, for example if the path from the outlet of the pump 112 is blocked or sealed by the servo valve 106, the piston 116 can shift to vent pressure from the outlet of the pump 112 back to the inlet of the pump 112. Other types of pressure regulators can be used.

In certain instances, the servo valve 106 is of a type that includes a valve body 202 that defines an internal piston cavity 204 and a routing piston 214 sealingly received within the cavity 204. Other types of servo valves can be used.

In the servo valve 106 of FIG. 1, the internal piston cavity 204 has a port 206 in communication with the pressure source 110, a port 208 in communication with the first pressure path, a port 210 in communication with the second pressure path and a port 212 in communication with the pressure drain. Within the valve body 202, the pressure source 110 is communicated to the location near the top of the piston cavity 204 and a location near the bottom of the piston cavity 204.

The routing piston 214 has a first control passage 216 spaced apart from a second control passage 218. The control passages 216, 218 are configured so that when a control passage is overlapping two ports, it allows fluid communication between those two ports. When a control passage is not overlapping the two ports, i.e., a portion of the piston 214 is covering one or the other of the two ports, fluid is sealed against communicating between those two ports. When the piston 214 is in an upper position, the first control passage 216 communicates the first pressure path with the pressure drain (i.e., port 208 and port 212) and the second control passage 218 communicates the pressure source 110 to the second pressure path (i.e., port 206 and port 210). When the piston 214 is in a down position, the first control passage 216 communicates the pressure source 110 to the first pressure path (i.e., port 206 and port 208) and the second control passage 218 communicates the second pressure path to the pressure drain (i.e., port 210 and port 212). Finally, when the piston 214 is in an intermediate position, between the up position and the down position, the first control passage 216 communicates the pressure source 110 to the first pressure path (i.e., port 206 and port 208) and the second control passage 218 communicates the pressure source 110 to the second pressure path (i.e., port 206 and 210). An electrically responsive servo 220 is coupled to the routing piston 214 to move the routing piston 214 between the upper, intermediate and lower positions in response to a signal from the ECU 108.

The first pressure path is in fluid communication between the servo valve 106 and a propeller pitch piston 118. The propeller pitch piston 118 is mechanically coupled to the blade pitch adjustment mechanism of the propeller 102 so that when pressure in the first pressure path is at or near the specified pressure output from the pressure source 110, it drives the piston 118 in a first direction (upward, toward the propeller 102, in FIG. 1) to adjust the blade pitch adjustment mechanism of the propeller 102 towards fine, i.e. towards shallow blade pitch. When pressure in the first pressure path is decreased below the specified pressure of the pressure source 110 it allows the piston 118 to shift in a second, opposing direction (downward, away from the propeller 102, in FIG. 1) to adjust the blade pitch adjustment mechanism of the propeller 102 towards coarse, i.e. towards a high blade pitch. Thus, in flight mode, to decrease the blade pitch toward fine, the servo valve 106 is adjusted to communicate the pressure source 110 to the propeller pitch piston 118. In flight mode, to increase the blade pitch towards coarse, the servo valve 106 is operated to communicate the pressure drain to the propeller pitch piston 118.

A beta valve 120 is in fluid communication with the first pressure path between the servo valve 106 and the propeller pitch piston 118. The beta valve 120 is also in fluid communication with the pressure drain. The beta valve 120 is changeable between sealing against fluid communication and allowing fluid communication between the servo valve 106 and the propeller pitch piston 118 through the first pressure path. Also, when the beta valve 120 is sealing against fluid communication between the servo valve 106 and the propeller pitch piston 118, it communicates the propeller pitch piston 118 to the pressure drain.

In certain instances, the beta valve 120 is a type having a piston 226 sealingly received in a cylinder 222. The end of the cylinder 222 is in fluid communication to the pressure drain. A side wall of the cylinder 222 has an inlet from the servo valve 106 via the first pressure path and an outlet to the propeller pitch piston 118 via the first pressure path. The piston 226 has a control passage 224 intermediate its ends. When the piston 226 is in a first position (downward in FIG. 1), the inlet and outlet in the first fluid path are communicated via the control passage 224 (i.e., communicating pressure between the servo valve 106 and the propeller pitch piston 118) and the pressure drain is sealed from the first fluid path. However, when the piston 226 is in a second position (upward in FIG. 1), the control passage 224 is moved out of communication with the inlet and outlet in the first fluid path and the outlet is communicated with the pressure drain (i.e., communicating the propeller pitch piston 118 and the pressure drain).

When the servo valve 106 is adjusted to communicate the pressure source 110 to the propeller pitch piston 118, it translates the propeller pitch piston 118 to move blade pitch towards fine (toward the propeller 102 in FIG. 1). When the propeller pitch piston 118 is communicated to the pressure drain, either by the servo valve 106 or by the beta valve 120, it translates the propeller pitch piston 118 to move blade pitch towards coarse (away from the propeller 102 in FIG. 1).

The beta valve 120 is coupled to a mechanical linkage 122 extending between the blade pitch adjustment mechanism of the propeller 102 and a beta hydraulic actuator 124. The beta valve 120 and mechanical linkage 122 operate to maintain the blade pitch from exceeding a minimum blade pitch by venting pressure in the first fluid path to the pressure drain when the blade pitch exceeds the minimum blade pitch.

To this end, the mechanical linkage 122 is coupled to the blade pitch adjustment mechanism so that one end of the linkage moves while the other end pivots on the beta hydraulic actuator 124. The beta valve 120 is coupled intermediate to these ends, such that when the pitch mechanism end of the mechanical linkage 122 translates with the propeller pitch piston 118 toward fine (towards the propeller 102 in FIG. 1), the beta valve 120 moves towards sealing against fluid communication between the servo valve 106 and the propeller pitch piston 118 and moves toward venting pressure from the propeller pitch piston 118 to the pressure drain. The mechanical linkage 122 is calibrated such that when the blade pitch reaches the minimum blade pitch, the beta valve 120 seals against fluid communication between the servo valve 106 and the propeller piston 118 and vents pressure from the propeller pitch piston 118 to pressure drain. As will be discussed in more detail below, by adjusting the position of the beta hydraulic actuator 124 (and thus the relationship between the mechanical linkage 122 and the blade pitch adjustment mechanism of the propeller 102), the minimum blade pitch that the beta valve 120 controls can be adjusted to pilot specified values.

In the flight range of blade pitch, the beta hydraulic actuator 124 is in an uppermost position. The mechanical linkage 122 moves the beta valve 120 to vent the propeller pitch piston 118 to the pressure drain when the blade pitch reaches the minimum pitch of the flight range and increases the blade pitch over the minimum pitch in the flight range, regardless of the operation of the servo valve 106. As the blade pitch moves away from the minimum pitch, the mechanical linkage 122 moves the beta valve 120 back to allowing fluid communication between the servo valve 106 and the propeller pitch piston 118, thus yielding control back to the operation of the servo valve 106. If, for example, the servo valve 106 is maintained in a state that drives the blade pitch toward the minimum pitch, the mechanical linkage 122 and beta valve 120 will continue to intervene and prevent the blade pitch from exceeding the minimum pitch of the flight range.

Adjusting the position of the beta hydraulic actuator 124, and thus the relationship between the mechanical linkage 122 and the blade pitch adjustment mechanism of the propeller 102, adjusts the minimum blade pitch that the beta valve 120 operates to maintain. Notably, when operating, the propeller 102 inherently tends toward minimum blade pitch. Thus, in beta mode, controlling the minimum blade pitch is tantamount to controlling blade pitch.

The servo valve 106 has an outlet to the second pressure path, and the second pressure path is in fluid communication with the beta hydraulic actuator 124. The beta hydraulic actuator 124 is responsive to pressure from the servo valve 106 to adjust the pivot position of the mechanical linkage 122. When the servo valve 106 communicates the specified pressure of the pressure source 110 to the beta hydraulic actuator 124, the beta hydraulic actuator 124 moves the pivot position of the mechanical linkage 122 toward the uppermost position (i.e., the flight mode position). When the servo valve 106 communicates the pressure drain to the beta hydraulic actuator 124, the beta hydraulic actuator 124 moves the pivot point of the mechanical linkage 122 downward from the uppermost position. Moving the pivot point downward from the uppermost (flight mode) position, decreases the minimum blade pitch that the beta valve 102 maintains above. Thus, by adjusting the position of the beta hydraulic actuator 124, the specified minimum blade pitch can be adjusted.

In certain instances, the beta hydraulic actuator 124 is of a type having a piston 230 sealingly received in a cylinder 232, where the pivot point of mechanical linkage 122 is coupled to the piston 230. Other types of servo valves can be used. In the beta hydraulic actuator 124 of FIG. 1, one side of the piston 230 is in communication with the pressure source 110 and the other side of the piston is in fluid communication with the servo valve 106 via the second pressure path. The piston 230 is biased (e.g. by a spring and/or otherwise) upward towards a stop shoulder 234 on the side of the piston 230 in fluid communication with the pressure source 110. When the piston 230 is abutting the shoulder 234, the beta hydraulic actuator 124 is in the uppermost position and in the flight mode. When pressure in the second pressure path is decreased to the pressure drain, overcoming the upward bias of the piston 230 (e.g., overcoming the spring), the piston 230 translates downward, away from the shoulder 234. Translating the piston away from the shoulder moves the pivot point of the mechanical linkage 122 downward. When pressure in the second pressure path is increased back to the specified pressure of the pressure source 110, the piston translates upward, back towards the shoulder 234. In certain instances, the beta hydraulic actuator 124 includes a position sensor 132 (e.g., a linear variable differential transformer (LVDT) and/or another type of position sensor) coupled to the piston 230 that outputs a signal indicating the position of the piston 230.

In some cases, with the piston against the stop, blade pitch is maintained within a first range of blade pitch at least in part by a valve venting pressure from the first pressure path. In some cases, with the piston apart from the stop, blade pitch is maintained within a second range of blade pitch at least in part by a valve venting pressure from the first pressure path.

The servo valve 106 can be operated to control the beta hydraulic actuator 124 to change the specified minimum blade pitch in a beta pitch control mode. In the beta pitch control mode, the servo valve 106 is configured to maintain communication between the first pressure path and the pressure source while communicating the second pressure path to the pressure drain or communicating the second pressure path to the pressure source. Therefore, when the servo valve 106 is changing the pressure in the second pressure path to move the beta hydraulic actuator 124 and change the specified minimum blade pitch maintained by the beta valve 120, the first pressure path maintained at the specified pressure of the pressure source and control of the propeller pitch via the first pressure path is effectively locked out. Contrasting the beta pitch control mode with the flight mode, in flight mode, the servo valve 106 is configured to maintain communication of the second pressure path and the pressure source while the servo valve 106 is communicating the first pressure path to the pressure drain or communication the first pressure path to the pressure source. Therefore, when the servo valve 106 is changing the pressure in the first pressure path to move the propeller pitch piston 118 and adjust blade pitch, the second pressure path maintained at the specified pressure of the pressure source and control of the propeller pitch via the second pressure path is effectively locked out.

The ECU 108 receives input from a number of sources, including a prop speed sensor 240, a throttle or condition lever sensor 242, a power lever sensor 244, a beta mode switch 250, a beta hydraulic actuator position sensor 132 and/or other sensors. In flight mode, the pilot specifies constant speed mode via the condition lever read by the condition lever sensor 242. Then, using the power lever read by the power lever sensor 244, the pilot specifies a propeller speed/engine speed of the engine driving the propeller 102. The ECU 108 receives the specified propeller speed via the power lever sensor 244. The ECU 108 then controls the load on the engine by controlling the blade pitch within the flight mode range of blade pitch to maintain the specified propeller speed.

For example, the ECU 108 receives an input from the prop speed sensor 240 indicating the actual speed of the propeller 102. If the speed indicated from the prop speed sensor 240 is less than the specified propeller speed, the ECU 108 adjusts the servo valve 106 to communicate the pressure source 110 to the propeller pitch piston 118 via the first pressure path, decreasing the blade pitch toward fine. As the blade pitch decreases, the load on the engine decreases, and the engine and propeller speed will increase without need to adjust the engine throttle. If the speed indicated from the prop speed sensor 240 is greater than the specified propeller speed, the ECU 108 adjusts the servo valve 106 to communicate the pressure drain to the propeller pitch piston 118 via the first pressure path, increasing the blade pitch toward coarse. As the blade pitch increases, the load on the engine increases, and the engine and propeller speed will decrease without need to adjust the engine throttle.

The ECU 108 changes from flight mode to beta mode in response to a signal from the beta mode switch 250. In certain instances, the beta mode switch 250 can be actuated by the pilot to signal the ECU 108 into beta mode, for example, by moving the power lever into the beta range of operation. In other instances, the beta mode switch 250 can be coupled to with another system to actuate the ECU 108 into beta mode in response to an action of the other system. In beta mode, the pilot specifies a blade pitch via the power lever. The ECU 108 receives the specified blade pitch via the pilot control power lever sensor 244 which is coupled to the power lever. The ECU 108 then controls the blade pitch to meet the specified blade pitch within the beta mode range of blade pitch.

For example, the ECU 108 receives an input from the beta mode switch 250 to enter beta mode, and thereafter begins responding to the specified blade pitch received from the pilot control power lever sensor 244. As noted above, in beta mode, the position of beta hydraulic actuator 124 determines the blade pitch. Thus, the ECU 108 determines blade pitch from the beta hydraulic actuator position sensor 132 and compares this determination to the specified blade pitch received from the pilot control power lever sensor 244. If the specified blade pitch is more than the measured blade pitch, the ECU 108 adjusts the servo valve 106 to communicate the pressure source 110 to the beta hydraulic actuator 124 via the second pressure path, moving the pivot point of the mechanical linkage 122 upward to increase the blade pitch towards coarse. If the specified blade pitch is less than the measured blade pitch, the ECU 108 adjusts the servo valve 106 to vent the beta hydraulic actuator 124 to the pressure drain via the second pressure path, move the pivot point of the mechanical linkage 122 downward and decrease the blade pitch towards fine. Notably, in beta mode, the pilot can specify a reverse pitch via the pilot control power lever. In response, the ECU 108 adjusts the servo valve 106 to vent the beta hydraulic actuator 124 to the pressure drain to move the pivot point of the mechanical linkage 122 still further downward, and decrease the blade pitch into a reverse blade pitch.

In certain instances, the first pressure path includes a feather solenoid valve 126 changeable between communicating the first pressure path to the propeller pitch piston 118 and venting the first pressure path to the pressure drain. The feather solenoid valve 126 defaults to communicating the first pressure path to the propeller pitch piston 118. The feather solenoid valve 126 is responsive to an electrical signal, for example a signal by the pilot or from the ECU 108, to vent the first pressure path to the pressure drain to rapidly decouple the blade pitch control from the servo valve 106 and allow the blade pitch to increase to maximum. For example, the feather solenoid valve 126 may be operated to disable the blade pitch control on a failed engine and allow the blade pitch to increase to maximum, aligning the blades with the wind direction to reduce drag.

In certain instances, the second pressure path includes a beta lockout solenoid valve 128 changeable between communicating the pressure source to the beta hydraulic actuator 124 via the second pressure path while sealing communication of the servo valve 106 to the beta hydraulic actuator 124 via the second pressure path. The beta lockout solenoid valve 128 is responsive to an electrical signal, for example a signal by the pilot or from the ECU 108, to change between communicating the servo valve 106 and the beta hydraulic actuator 124 via the second pressure path and communicating the pressure source 110 to the beta hydraulic actuator 124 via the second pressure path. The beta lockout solenoid valve 128 defaults to communicating the pressure source 110 to the beta hydraulic actuator 124. When communicating the pressure source 110 to the beta hydraulic actuator 124, the beta hydraulic actuator 124 is held in the flight mode position, with the piston abutting the shoulder, regardless of the state of the servo valve 106. As such, the beta lockout solenoid valve 128 defaults to preventing the hydraulic control governor 100 from entering the beta mode. When signaled, the beta lockout solenoid valve 128 switches to communicating the servo valve 106 to the beta hydraulic actuator 124 via the second pressure path, thus surrendering control of the beta hydraulic actuator 124 to the servo valve 106.

By having only one servo valve 106 that operates both flight mode and beta mode, the propeller governor 100 of FIG. 1 can be lower cost and lighter weight than governors having two servo valves 106. Further, because the governor 100 includes only one servo valve 106, the possible modes of failure are reduced over systems with multiple servos.

Figure 2:
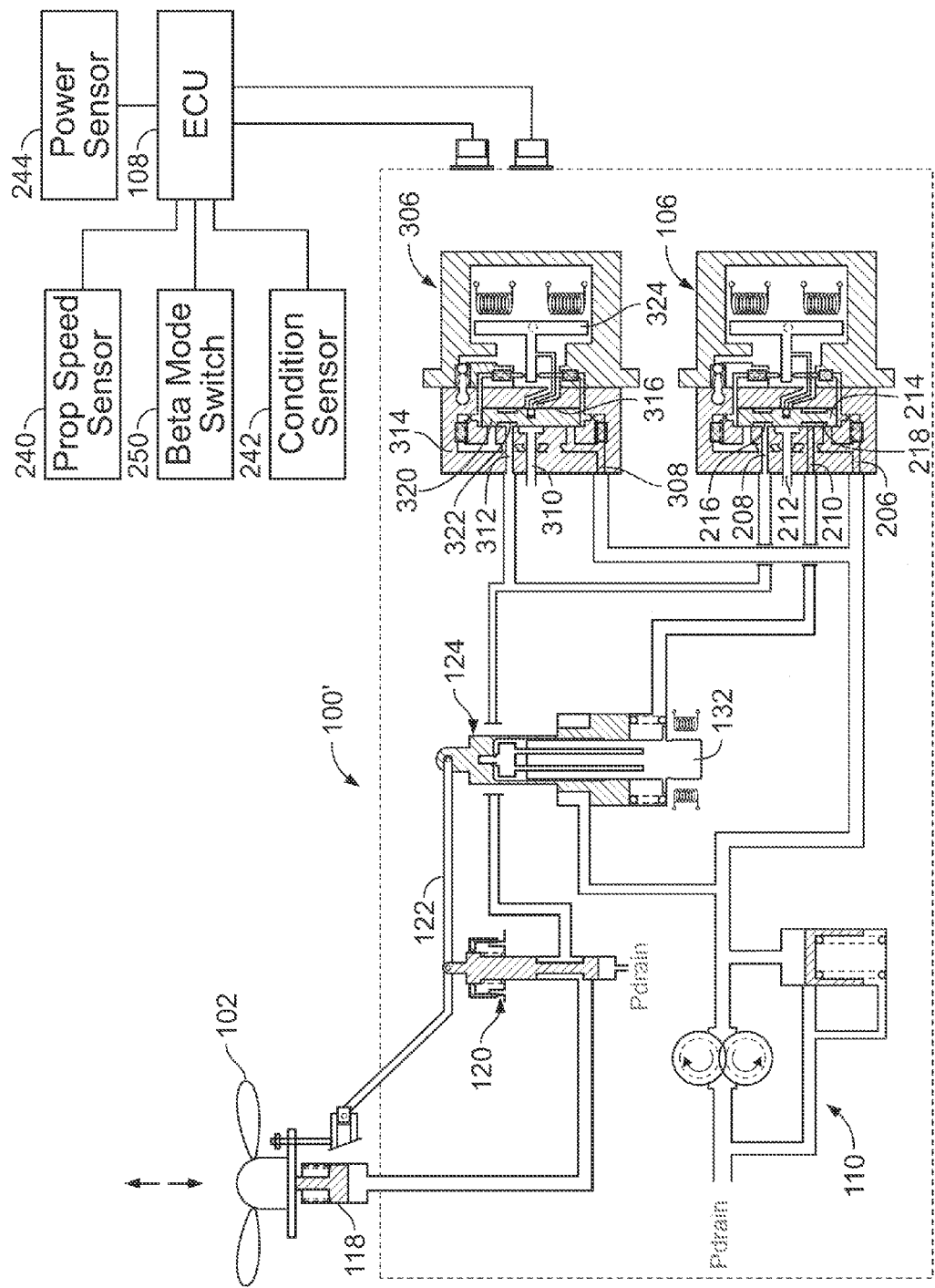
FIG. 2 is a schematic of another example electrohydraulic propeller governor.

FIG. 2 shows another example electrohydraulic propeller governor 100' that differs from the electrohydraulic propeller governor 100 in that it includes a second electrohydraulic servo valve 306 to isolate flight mode control from beta mode control. Like the servo valve 106, the servo valve 306 includes a valve body 314 that defines an internal piston cavity 316. The piston cavity 316 includes routing piston 320 sealingly received therein. The piston cavity 316 includes a port 308 in communication with the pressure source 110, a port 310 in communication with the pressure drain, and a port 312 in communication with the first pressure path. The routing piston 320 has a control passage 322 intermediate its ends. When the piston 320 is in an upper position, the control passage 322 communicates the pressure source 110 to the first pressure path. When the piston is in a downward position, the control passage 322 communicates the pressure drain to the first pressure path. Finally, when the piston 320 is in an intermediate position, it seals the first pressure path. An electrically responsive servo 324 is coupled to the routing piston 322 to move the routing piston 320 between the upper, intermediate and lower positions in response to a signal from the ECU 108.

In flight mode, the piston 320 is positioned in the intermediate position to seal the first pressure path and allow the servo valve 106 to control the pressure through the first pressure path to the propeller pitch piston 118. In beta mode, the piston 320 is positioned in the upper position to communicate the pressure source 110 to the first pressure path, so that the servo valve 106 can control the beta hydraulic actuator 124 by controlling the blade pitch. However, the servo valve 306 can be operated to lock out control of the servo valve 106. For example, the piston 320 can be positioned in the downward position to communicate the pressure drain to the first pressure path, and like the feather solenoid valve 126, decouple the blade pitch control from the servo valve 106 and allow the blade pitch to increase to maximum.

Figure 3:
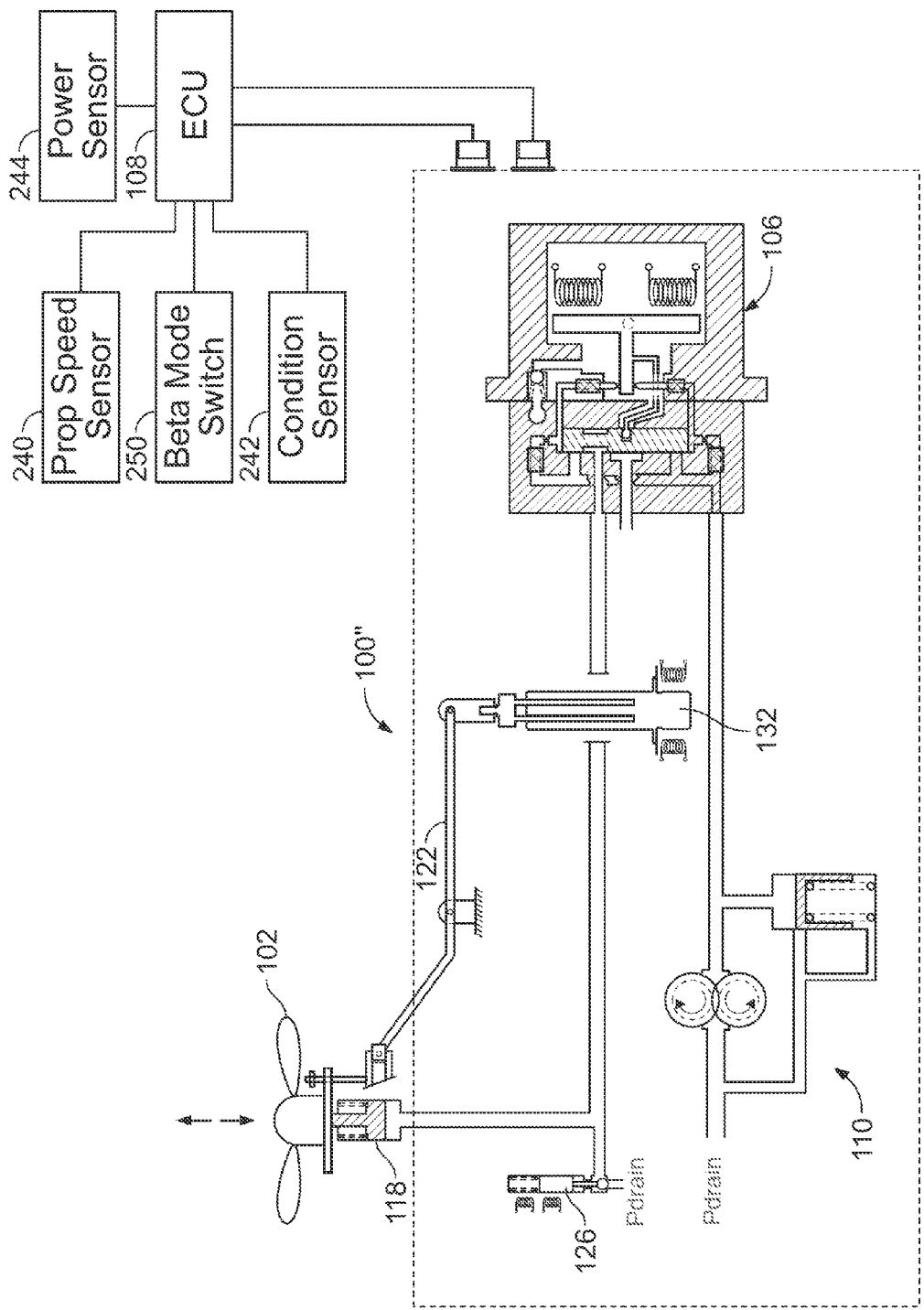
FIG. 3 is a schematic of yet another example electrohydraulic propeller governor.

FIG. 3 shows another example electrohydraulic propeller governor 100" that differs from the electrohydraulic propeller governor 100 in that the governor does not include a separate beta mode control. Thus, the governor 100" does not include a beta valve or beta hydraulic actuator and the servo valve 106 controls blade pitch over the flight and beta ranges in the same manner. In this configuration, the mechanical linkage 122 is coupled to a position sensor 132 (e.g., a linear variable differential transformer (LVDT) and/or another type of position sensor) that outputs a signal indicating the position of the end of the mechanical linkage 122. The mechanical linkage 122 pivots around an intermediate, fixed pivot point as the blade pitch changes. The mechanical linkage 122 communicates the blade pitch to the position sensor 132 as displacement of the end of the mechanical linkage 122 and the position sensor 132, in turn, communicates the blade pitch to the ECU 108 as an electric signal.

A number of embodiments have been described. Nevertheless, it will be understood that various modifications may be made. Accordingly, other embodiments are within the scope of the following claims.

What is claimed is:

1. A propeller governor for controlling blade pitch of a variable pitch propeller, the propeller governor comprising:
    a hydraulic control circuit coupled to the propeller to change blade pitch in response to hydraulic pressure, the hydraulic control circuit having:
        a first pressure path configured to adjust blade pitch within a first range of blade pitch;
        a second, different pressure path configured to adjust blade pitch within a second range of blade pitch, the first pressure path being a flight pressure path and the second pressure path being a beta pressure path;
        a pressure source in fluid communication with an electrohydraulic servo valve,
        a pressure drain having lower pressure than the pressure source, the pressure drain in fluid communication with the electrohydraulic servo valve, and
        a propeller pitch piston coupled to the propeller to change blade pitch in response to hydraulic pressure, the propeller pitch piston in fluid communication with the electrohydraulic servo valve via the first pressure path;
        wherein the electrohydraulic servo valve communicates the pressure source to the propeller pitch piston to decrease blade pitch within the first range of blade pitch and communicates the pressure drain to the propeller pitch piston to increase blade pitch within the first range of blade pitch; and
        a second valve in fluid communication with the first pressure path, in fluid communication with the pressure drain, and coupled to the propeller pitch piston, the second valve configured to allow passage of pressure through the first pressure path when blade pitch is within the first range of blade pitch and vent pressure from the first pressure path when blade pitch is below the first range of blade pitch; and wherein the electrohydraulic servo valve is configured to:
adjust hydraulic pressure in the first pressure path to adjust blade pitch within the first range when the propeller is operated in a flight mode, and
adjust hydraulic pressure in the second pressure path to adjust blade pitch within the second range when the propeller is operated in a beta mode.

2. The propeller governor of claim 1, further comprising an electronic control unit coupled to the electrohydraulic servo valve to control the electrohydraulic servo valve in adjusting hydraulic pressure in the first pressure path in response to a user specified rotational speed of the propeller and to control the electrohydraulic servo valve in adjusting hydraulic pressure in the second pressure path in response to a user specified blade pitch.

3. The propeller governor of claim 1, where the first range of blade pitch includes only forward pitch angles and the second range of blade pitch includes both reverse pitch angles and forward pitch angles.

4. The propeller governor of claim 1, further comprising a hydraulic actuator coupled to the propeller pitch piston to change blade pitch in response to hydraulic pressure, the hydraulic actuator in fluid communication with the electrohydraulic servo valve via the second pressure path; and
where the electrohydraulic servo valve communicates the pressure source to the hydraulic actuator to decrease blade pitch within the second range of blade pitch and communicates the pressure drain to the hydraulic actuator to increase blade pitch within the second range of blade pitch.

5. The propeller governor of claim 4, where the hydraulic actuator comprises an actuator piston coupled to the propeller pitch piston, the piston of the hydraulic actuator in fluid communication with the second pressure path; and
where when the electrohydraulic servo valve is increasing or decreasing blade pitch via the first pressure path, the electrohydraulic servo valve applies pressure through the second pressure path to maintain the piston against a stop.

6. The propeller governor of claim 5, where with the piston against the stop, blade pitch is maintained within the first range of blade pitch at least in part by the second valve venting pressure from the first pressure path.

7. The propeller governor of claim 5, where with the piston apart from the stop, blade pitch is maintained within the second range of blade pitch at least in part by the second valve venting pressure from the first pressure path.

8. The propeller governor of claim 4, further comprising a lockout valve in the second pressure path changeable between (a) allowing fluid communication between the second pressure path and the hydraulic actuator and (b) sealing the hydraulic actuator from the second pressure path and allowing fluid communication between the pressure source and the hydraulic actuator.

9. The propeller governor of claim 1, further comprising a second electrohydraulic servo valve configured to adjust hydraulic pressure in the first pressure path.

10. The propeller governor of claim 1, where the electrohydraulic servo valve comprises:

a valve body defining a piston cavity having a pressure source inlet, an outlet to the first pressure path, an outlet to the second pressure path and an outlet to a pressure drain;
a routing piston sealingly received in the piston cavity having a first passage spaced apart from a second passage where,
(a) in a first piston position, the first passage communicates the pressure source to the first pressure path while the second passage communicates the pressure source to the second pressure path,
(b) in a second piston position, the first passage communicates the first pressure path to the pressure drain while the second passage communicates the pressure source to the second pressure path, and
(c) in a third piston position the first passage communicates the pressure source to the first pressure path and the second passage communicates the second pressure path to the pressure drain; and
an electrically responsive servo coupled to the routing piston to move the routing piston.

11. The propeller governor of claim 1, further comprising a lockout that blocks the blade pitch from entering the second range regardless of the operation of the electrohydraulic servo valve.

12. The propeller governor of claim 1, wherein the first range of blade pitch includes only forward pitch angles used during flight, and the second range of blade pitch includes both forward pitch angles and reverse pitch angles used during taxiing.

13. A method of controlling blade pitch of a variable pitch propeller, the method comprising:
signaling an electrohydraulic servo valve, in fluid communication with a pressure source and a pressure drain having lower pressure than the pressure source, to adjust hydraulic pressure in a propeller pitch piston in a first pressure path of a propeller governor to adjust blade pitch of the propeller within a first range of blade pitch when the propeller is operated in a flight mode, wherein the electrohydraulic servo valve communicates the pressure source to the propeller pitch piston to decrease blade pitch within the first range of blade pitch and communicates the pressure drain to the propeller pitch piston to increase blade pitch within the first range of blade pitch; and
signaling the electrohydraulic servo valve and a second valve in fluid communication with the first pressure path, in fluid communication with the pressure drain, and coupled to the propeller pitch piston, to adjust hydraulic pressure in a second pressure path of the propeller governor to adjust blade pitch of the propeller within a second range of blade pitch when the propeller is operated in a beta mode, wherein the second valve is configured to allow passage of pressure through the first pressure path when blade pitch is within the first range of blade pitch and vent pressure from the first pressure path when blade pitch is in the second range of blade pitch,
wherein the first range of blade pitch is a flight range of blade pitch and the second range of blade pitch is a beta range of blade pitch.

14. The method of claim 13, further comprising supplying constant pressure through the second pressure path while adjusting pressure in the first pressure path to prevent adjusting blade pitch via the second pressure path.

15. The method of claim 14, where supplying constant pressure through the second pressure path comprises signaling a second valve to supply constant pressure through the second pressure path.

16. The method of claim 13, wherein the first range of blade pitch includes only forward pitch angles used during flight, and the second range of blade pitch includes both forward pitch angles and reverse pitch angles used during taxiing.

* * * * *